(12) United States Patent
Koyama

(10) Patent No.: US 8,276,926 B2
(45) Date of Patent: Oct. 2, 2012

(54) REAR SUSPENSION SPRING SUPPORT STRUCTURE

(75) Inventor: Hiroyuki Koyama, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 203 days.

(21) Appl. No.: 12/818,323

(22) Filed: Jun. 18, 2010

(65) Prior Publication Data

US 2010/0327570 A1    Dec. 30, 2010

(30) Foreign Application Priority Data

Jun. 26, 2009    (JP) ................................ 2009-151942

(51) Int. Cl.
*B62D 21/11*    (2006.01)
(52) U.S. Cl. ............ 280/124.109; 280/781; 296/193.07; 296/193.08; 296/203.04
(58) Field of Classification Search ............ 296/193.07, 296/193.08, 187.08, 187.11, 193.02, 193.04, 296/203.01, 203.04; 280/781, 124.109
See application file for complete search history.

(56) References Cited

U.S. PATENT DOCUMENTS

| | | | | |
|---|---|---|---|---|
| 5,005,857 A | * | 4/1991 | Camuffo | 280/124.109 |
| 5,350,214 A | * | 9/1994 | Yamauchi et al. | 296/204 |
| 5,580,121 A | * | 12/1996 | Dange et al. | 296/181.4 |
| 5,788,322 A | * | 8/1998 | Wolf et al. | 296/181.4 |
| 6,109,653 A | * | 8/2000 | Maruyama et al. | 280/781 |
| 6,113,180 A | * | 9/2000 | Corporon et al. | 296/203.04 |
| 6,547,281 B1 | * | 4/2003 | Iwatsuki | 280/785 |
| 7,021,703 B2 | * | 4/2006 | Yamaguchi et al. | 296/203.04 |
| 7,040,639 B2 | * | 5/2006 | Tamura | 280/124.147 |
| 7,380,856 B2 | * | 6/2008 | Kobayashi et al. | 296/37.2 |
| 7,427,098 B2 | * | 9/2008 | Kobayashi et al. | 296/203.04 |
| 8,079,608 B2 | * | 12/2011 | Weshendorff | 280/124.109 |
| 2005/0248185 A1 | * | 11/2005 | Hayashi | 296/193.07 |
| 2006/0061142 A1 | * | 3/2006 | Kobayashi et al. | 296/203.04 |
| 2007/0246971 A1 | * | 10/2007 | Hanakawa et al. | 296/203.01 |

FOREIGN PATENT DOCUMENTS

| | | |
|---|---|---|
| JP | 63-53873 U | 4/1988 |
| JP | 64-56368 U | 4/1989 |
| JP | 06227438 A * | 8/1994 |

OTHER PUBLICATIONS

Sekiguchi et al., Rear Suspension Spring Support Structure for Automobile, Apr. 11, 1988, JPO, JP 63-53873 U, English Translation of Description.*

* cited by examiner

*Primary Examiner* — Faye M Fleming
*Assistant Examiner* — James English
(74) *Attorney, Agent, or Firm* — Alston & Bird LLP

(57) ABSTRACT

A rear suspension spring support structure enables a rear side member to have an improved rigidity, and thus driving stability is improved. The rear suspension spring support structure has a rear cross member connected to a rear side member with a rear cross member extension being interposed therebetween. An extending portion, on a vehicle lateral side, of the rear cross member extension passes under the rear side member and extends to the vehicle lateral side of the rear side member. The extending portion is welded to a lower surface of the rear side member and a side surface of the vehicle lateral side. A coil spring bracket for receiving an upper end portion of the coil spring is joined to a lower surface of the rear cross member extension.

5 Claims, 5 Drawing Sheets

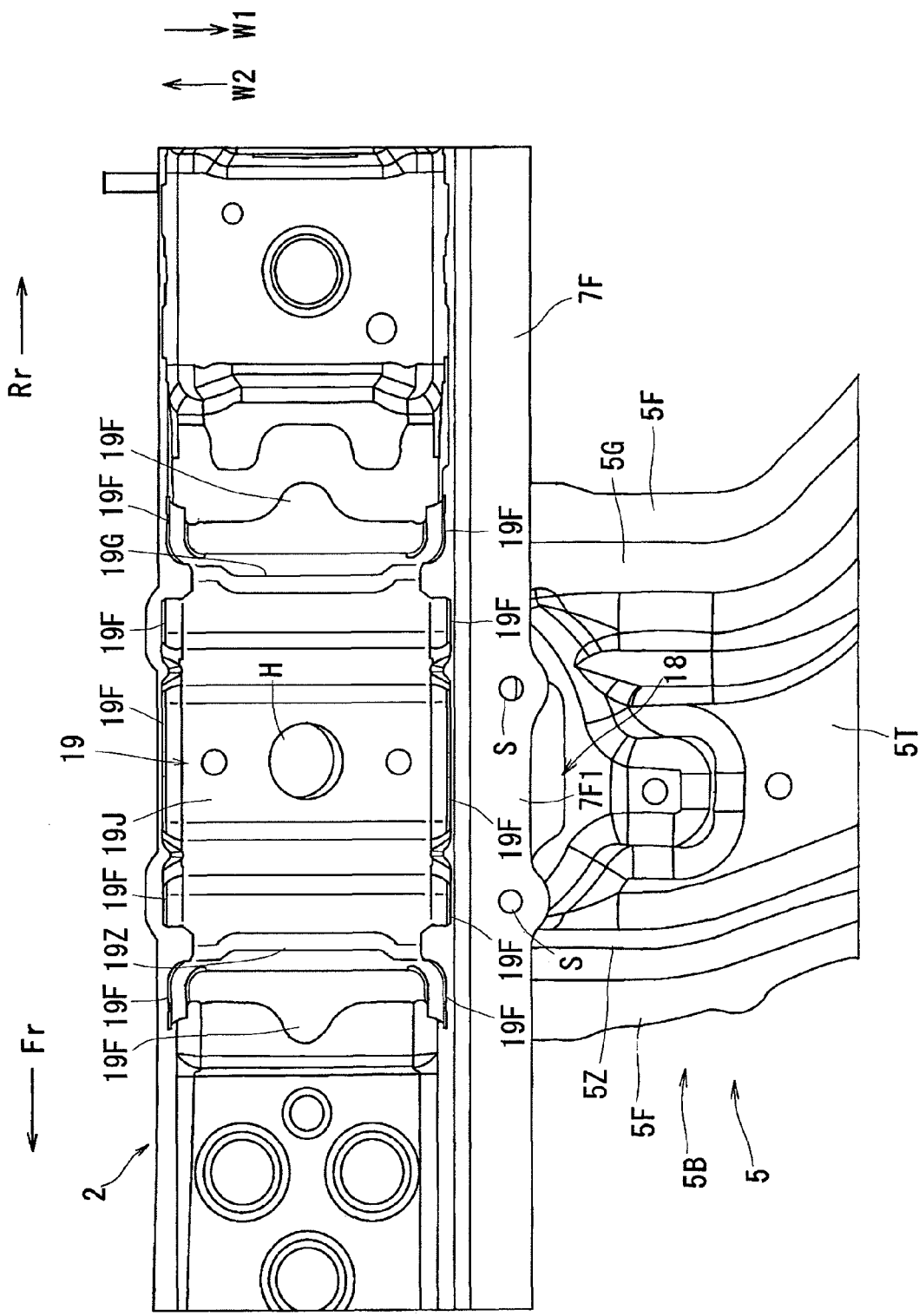

REAR SUSPENSION SPRING SUPPORT STRUCTURE

BACKGROUND OF THE INVENTION

1. Field of the Invention

The present invention relates to a rear suspension spring support structure in which an upper end portion of a coil spring for a rear suspension is supported with a rear side member.

2. Description of Related Art

A rear side member supports an upper end portion of a coil spring for a rear suspension. The rear side member is repeatedly subjected to a load from the coil spring along with the movement of the suspension during vehicle driving. For this reason, such a rear side member must have a certain rigidity and durability.

In this respect, as disclosed in Japanese Utility Model Registration Application Publication Nos. 1-56368 and 63-53873, end surfaces, on vehicle lateral sides, of a rear cross member are brought into contact with and joined to side surfaces, on the vehicle center side, of supporting portions of rear side members supporting upper end portions of coil springs, and partition walls are formed in the rear side members, conventionally.

The above-described conventional structure is such a simple structure that the end surfaces, on the vehicle lateral sides, of the rear cross member are brought into contact with and joined to the side surfaces, on the vehicle center side, of the rear side members. Hence, the side surfaces, on the vehicle lateral sides, of the rear side members tend to open toward the vehicle lateral sides because of a load repeatedly received from the coil spring. Accordingly, the rigidity of the rear side members cannot be secured, and thus the driving stability is difficult to improve.

SUMMARY OF THE INVENTION

The present invention has been made in view of the above-described circumstances, and an object of the present invention is to provide a rear suspension spring support structure which enables a rear side member to have an improved rigidity, thus improving the driving stability.

The present invention provides a rear suspension spring support structure in which an upper end portion of a coil spring for a rear suspension is supported with a rear side member. In the structure, a rear cross member is connected to the rear side member with a rear cross member extension interposed therebetween; an end portion, on a vehicle lateral side, of the rear cross member extension passes under the rear side member and extends to the vehicle lateral side of the rear side member, the extending portion of the rear cross member extension being welded to a lower surface of the rear side member and to a side surface, on the vehicle lateral side, of the rear side member; and a coil spring bracket for receiving the upper end portion of the coil spring is joined to a lower surface of the rear cross member extension.

With the above-described structure, a load from the coil spring is input to the rear side member through the coil spring bracket joined to the lower surface of the rear cross member extension.

Moreover, the above-described structure is as follows. Specifically, the rear cross member is connected to the rear side member with the rear cross member extension interposed therebetween. The end portion, on the vehicle lateral side, of the rear cross member extension passes under the rear side member and extends to the vehicle lateral side of the rear side member. The extending portion is welded to the lower surface of the rear side member and the side surface on the vehicle lateral side. Accordingly, the coupling rigidity of a coupling portion between the rear side member and the rear cross member extension is improved, and the side surface, on the vehicle lateral side, of the rear side member, can be firmly held by the rear cross member.

As a result, even when the side surface, on the vehicle lateral side, of the rear side member, is repeatedly subjected to a load from the coil spring, it is possible to make the side surface less likely to be opened toward the vehicle lateral side. Hence, the rigidity of the rear side member can be improved, and thereby the driving stability can be improved.

Moreover, since the rear cross member extension is interposed between the rear side member and the rear cross member, the degree of freedom in an assembly process can be secured. In addition, the rigidity of the coupling portion between the rear side member and the rear cross member can be effectively improved.

According to another aspect of the present invention, the rear side member includes an outer sidewall on the vehicle lateral side, an inner sidewall on a vehicle center side, and a bottom wall; the rear cross member extension includes a front wall on a vehicle front side, a rear wall on a vehicle rear side, and a bottom wall; the extending portion is provided to the bottom wall of the rear cross member extension; and the extending portion is welded to a lower surface of the bottom wall of the rear side member and to a side surface of the outer sidewall of the rear side member. With this structure, the following effects can be achieved.

The side surface of the outer sidewall of the rear side member can be firmly held by the rear cross member. As a result, it is possible to make the outer sidewall of the rear side member less likely to open toward the vehicle lateral side even when the outer sidewall is repeatedly subjected to a load from the coil spring. Hence, the rigidity of the rear side member can be improved, and thus the driving stability can be improved.

According to another aspect of the present invention, a center of the coil spring bracket in a radial direction thereof is located near the inner sidewall of the rear side member; a coil spring reinforcement is laid between a side surface, on the vehicle center side, of the inner sidewall and an upper surface of the bottom wall of the rear cross member extension; an upper end portion of the coil spring reinforcement is welded to the side surface, on the vehicle center side, of the inner sidewall; and a lower end portion of the coil spring reinforcement, the bottom wall of the rear cross member extension, and the coil spring bracket are integrally welded together, with the bottom wall of the rear cross member extension being sandwiched between the lower end portion of the coil spring reinforcement and the coil spring bracket. With this structure, the following effects can be achieved.

The coil spring reinforcement is located above a portion of the coil spring protruding from the rear side member toward the vehicle center side. The coil spring reinforcement receives a load from the coil spring, and transmits the load to the inner sidewall of the rear side member. This enables the load to be reliably supported by the rigid inner sidewall of the rear side member.

Moreover, the lower end portion of the coil spring reinforcement, the bottom wall of the rear cross member extension, and the coil spring bracket are integrally welded together, with the bottom wall of the rear cross member extension being sandwiched between the lower end portion of the coil spring reinforcement and the coil spring bracket. Accordingly, the lower end portion of the coil spring reinforcement, the bottom wall of the rear cross member extension, and the coil spring bracket can be firmly integrated together.

According to another aspect of the present invention, the outer sidewall and the inner sidewall of the rear side member located on a lateral side of the rear cross member extension are coupled to each other by a front wall on the vehicle front side and a rear wall on the vehicle rear side which are provided to a side member brace; the front wall of the side member brace and the front wall of the rear cross member extension are located at substantially the same position in a vehicle front-rear direction; and the rear wall of the side member brace and the rear wall of the rear cross member extension are located at substantially the same position in the vehicle front-rear direction. With this structure, the following effects can be achieved.

With the side member brace, the rigidity of the connecting portion between the rear side member and the rear cross member can be improved, and thus the rigidity of the outer sidewall and the inner sidewall of the rear side member can be improved. Accordingly, a load from the coil spring can be reliably received by the rear side member.

According to another aspect of the present invention, the side member brace includes a top wall coupling an upper end portion of the front wall of the side member brace to an upper end portion of the rear wall of the side member brace; the top wall of the side member brace couples the outer sidewall of the rear side member to the inner sidewall of the rear side member; a flange is formed in an end portion, on the vehicle center side, of the top wall of the side member brace; and the flange of the top wall of the side member brace, an upper end portion of the inner sidewall of the rear side member, and the upper end portion of the coil spring reinforcement are integrally welded together, with the upper end portion of the inner sidewall of the rear side member being sandwiched between the flange of the top wall of the side member brace and the upper end portion of the coil spring reinforcement. With this structure, the following effects can be achieved.

The outer sidewall and the inner sidewall of the rear side member are coupled to each other with the top wall of the side member brace. Hence, the rigidity of the outer sidewall and the inner sidewall of the rear side member can be further improved, and thus a load from the coil spring can be more reliably received by the rear side member.

Moreover, the flange is formed in the end portion, on the vehicle center side, of the top wall of the side member brace, and the flange of the top wall of the side member brace, the upper end portion of the inner sidewall of the rear side member, and the upper end portion of the coil spring reinforcement are integrally welded together, with the upper end portion of the inner sidewall of the rear side member being sandwiched between the flange of the top wall of the side member brace and the upper end portion of the coil spring reinforcement. Accordingly, the flange of the top wall of the side member brace, the upper end portion of the inner sidewall of the rear side member, and the upper end portion of the coil spring reinforcement can be firmly integrated with each other, and thus the rigidity of the inner sidewall of the rear side member can be more reliably improved.

According to another aspect of the present invention, the bottom wall of the rear side member, the bottom wall of the rear cross member extension, and the coil spring bracket are integrally welded together between the front wall and the rear wall of the side member brace. With this structure, the following effects can be achieved.

The upper end portion of the coil spring can be supported by a portion of the rear side member (the portion of the rear side member between the front wall and the rear wall of the side member brace) of which rigidity is improved by the side member brace. Hence, a load from the coil spring can be reliably received by the rear side member.

According to another aspect of the present invention, a flange which is joined to a floor panel is formed in the upper end portion of the inner sidewall of the rear side member; a reinforcing member which reinforces a side portion of a vehicle is arranged above the outer sidewall of the rear side member; and a portion of the flange of the inner sidewall located between the front wall and the rear wall of the rear cross member extension is coupled to the reinforcing member with a rear floor side brace being interposed therebetween. With this structure, the following effects can be achieved.

A vehicle interior is formed above the rear side member, and only the floor panel is disposed above the inner sidewall, on the vehicle center side, of the rear side member. With the above-described structure, however, the portion of the flange of the inner sidewall located between the front wall and the rear wall of the rear cross member extension is coupled to the reinforcing member which is a reinforcing structure for an upper portion of the vehicle body, with the rear floor side brace interposed therebetween. Hence, a load applied to the inner sidewall can be supported by the reinforcing member which reinforces a lateral portion of the vehicle body. Accordingly, torsion of the rear side member can be prevented, and the load from the coil spring can be reliably received by the rear side member.

According to the present invention, it is possible to provide a rear suspension spring support structure which enables the rear side member to have an improved rigidity, and thus the driving stability can be improved.

BRIEF DESCRIPTION OF THE DRAWINGS

FIG. 5 is a plan view of the rear suspension spring support structure.

DETAILED DESCRIPTION OF PREFERRED EMBODIMENTS

Hereinafter, an embodiment of the present invention is described on the basis of the drawings.

Figure 2:
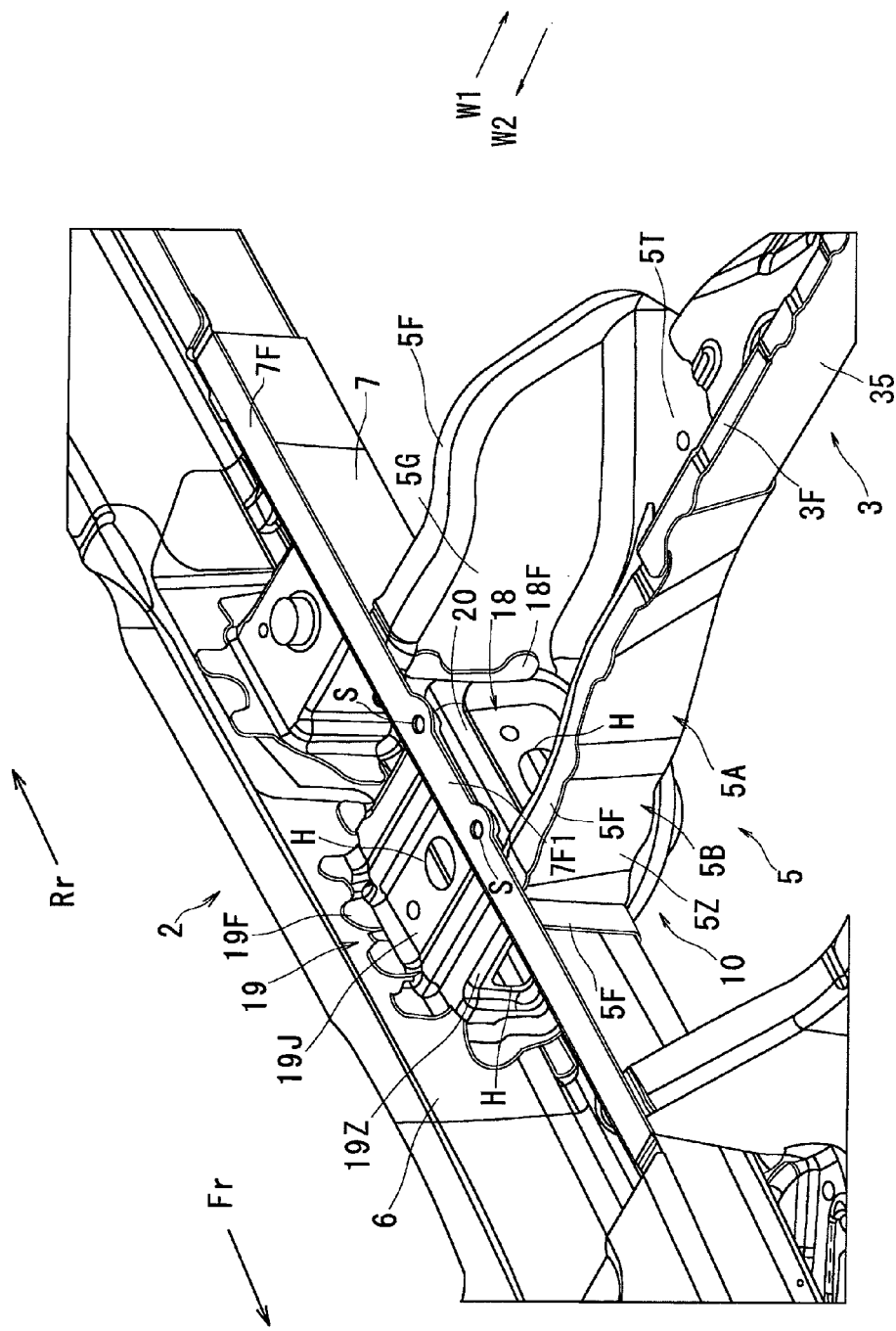
FIG. 2 is a perspective view of a rear suspension spring support structure viewed from the front and above.
Figure 3:
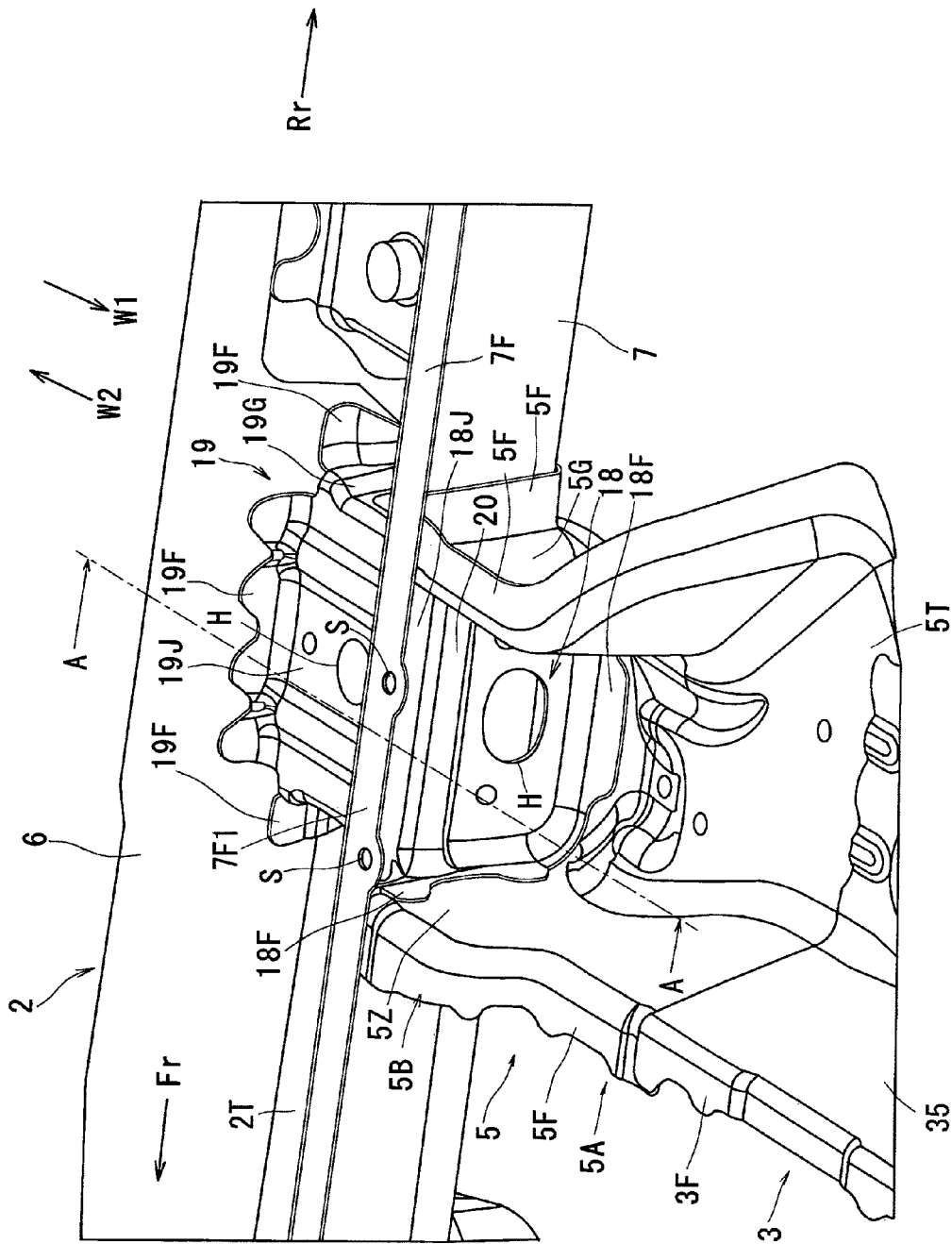
FIG. 3 is a perspective view of the rear suspension spring support structure viewed from above on a vehicle center side.
Figure 4:
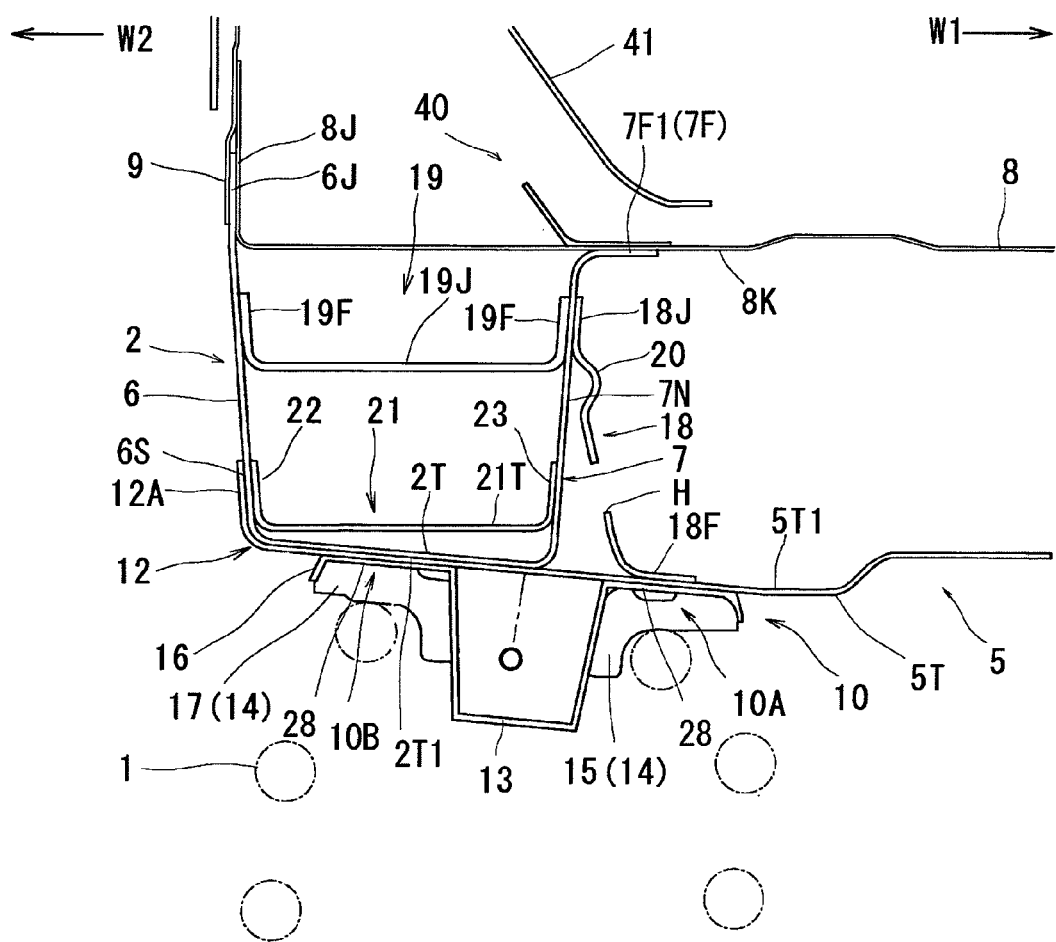
FIG. 4 is a cross-sectional view taken along the A-A line of FIG. 3.

FIGS. 2 to 4 show a rear suspension spring support structure in which upper end portions of paired right and left coil springs 1 for rear suspensions are supported with paired right and left rear side members 2 extending in a vehicle front-rear direction, respectively.

Figure 1:
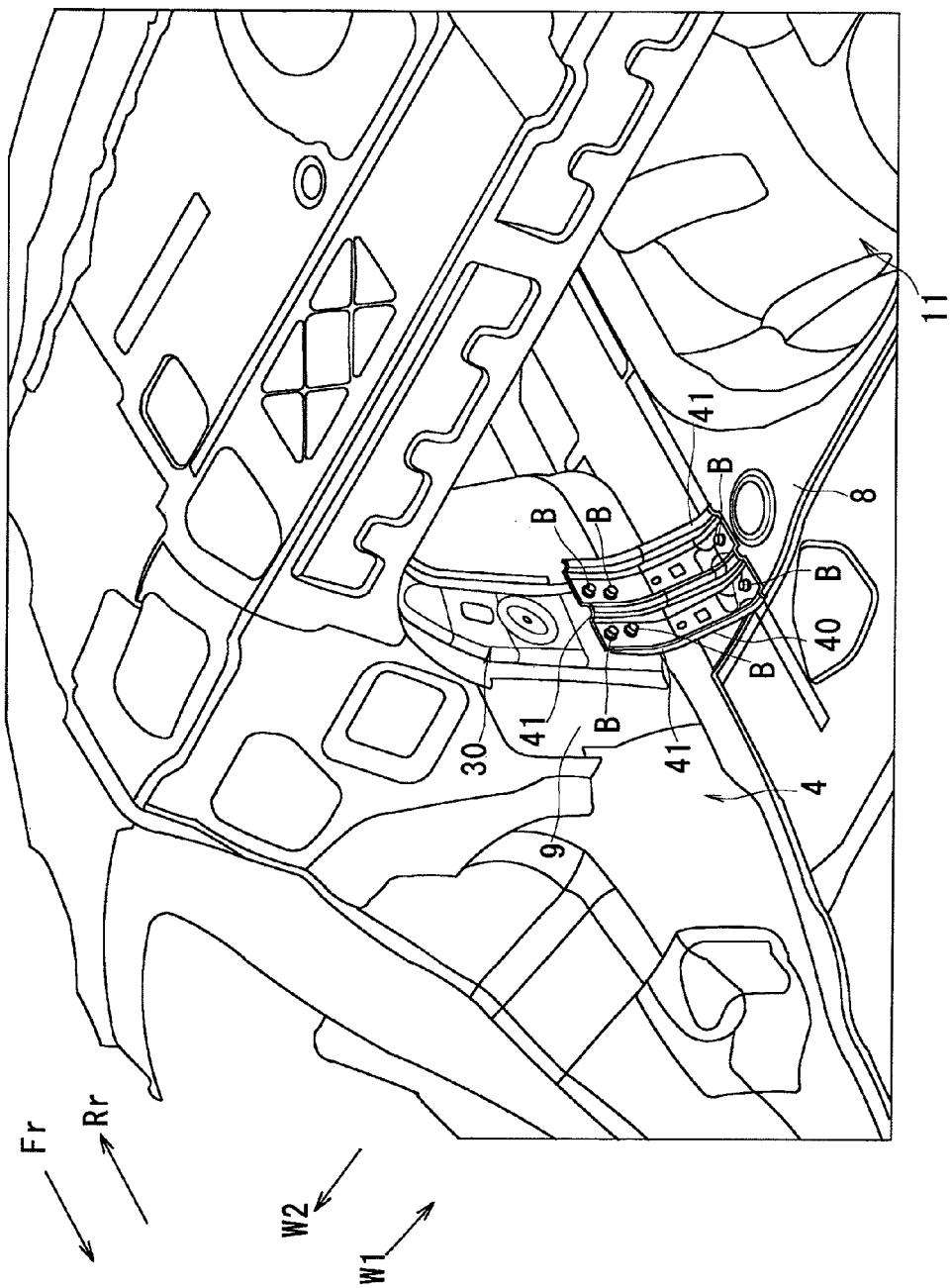
FIG. 1 is a perspective view of a vehicle body rear portion viewed from above on a vehicle center side.

A rear cross member 3 extending in a vehicle width direction is connected to each of the rear side members 2 with a rear cross member extension 5 being interposed therebetween. Thus, the right and left rear side members 2 are coupled to each other. Since the rear cross member extension 5 is interposed between the rear cross member 3 and each of the rear side members 2 as described above, a degree of freedom in an assembly process is ensured. As shown in FIG. 1, a wheelhouse 4 for a rear wheel is formed on a vehicle lateral side W2 of a connecting portion between the rear side member 2 and the rear cross member 3.

Structure of Rear Side Member 2

The rear side members 2 are skeletal frame members of a vehicle body. The rear side members 2 are arranged in a right and left pair under a rear floor panel in a vehicle body rear portion, and extend in the vehicle front-rear direction. As shown in FIG. 4, each of the rear side members 2 includes an outer sidewall 6 on the vehicle lateral side W2 (on an outer side in the vehicle width direction), an inner sidewall 7 on a vehicle center side W1 (on an inner side in the vehicle width direction), and a bottom wall 2T. The outer sidewall 6 and the inner sidewall 7 form a shape which becomes wider in an upper direction. A flange 7F is formed in an upper end portion of the inner sidewall 7, and bends and projects toward the vehicle center side. The flange 7F is superposed on and welded (spot-welded) to a lower surface 8K of a floor panel 8 of a rear floor. Thus, the rear side member 2 and the floor panel 8 form a closed cross-section.

The outer sidewall 6 extends upward beyond the flange 7F of the inner sidewall 7. Such extending upper end portion 6J is sandwiched between a raised wall 8J formed by bending upward the floor panel 8 at an edge thereof on the vehicle lateral side W2, and a lower edge of a wheelhouse inner panel 9. The raised wall 8J, the upper end portion 6J of the outer sidewall 6, and the wheelhouse inner panel 9 are integrally welded (spot-welded) together. As described above, the rear side member 2 and the floor panel 8 form the closed cross-section.

Each of the coil spring 1 is inclined in such a manner that an upper side of an axis of the coil spring 1 is located closer to the vehicle center side W1. In this respect, the bottom wall 2T of the rear side member 2 is inclined in such a manner that the bottom wall 2T is located lower toward the vehicle center side W1, so that the state of supporting the coil spring 1 with the bottom wall 2T is stabilized. This makes it possible to simplify the shape and the attachment of a coil spring bracket 10 to be described later. The width of the rear side member 2 (the width of the bottom wall 2T) is set smaller than the diameter of the coil spring bracket 10, described below.

Structure of Rear Cross Member 3

The rear cross member 3 is a skeletal frame member of the vehicle body. The rear cross member 3 is arranged under the rear floor panel of the vehicle body rear portion, and extends in the vehicle width direction. End portions, in the vehicle width direction, of the rear cross member 3 are coupled to the right and left rear side members 2. The rear cross member 3 is formed to have a hat-shaped cross-section with a top opening. A flange 3F at an upper end portion of the rear cross member 3 is welded to the lower surface 8K of the floor panel 8. Thus, the rear cross member 3 and the floor panel 8 form a closed cross-section. In this embodiment of the present invention, the rear cross member 3 is arranged close to a spare tire housing concave portion 11 (refer to FIG. 1) of the rear floor. A portion of the rear cross member 3 near a front end portion of the spare tire housing concave portion 11 is formed to have an L-shaped cross-section.

The portion of the rear cross member 3 near the front end portion of the spare tire housing concave portion 11 is welded to a front wall of the spare tire housing concave portion 11 and the floor panel 8. By utilizing the front wall of the spare tire housing concave portion 11, the front wall of the spare tire housing concave portion 11, the floor panel 8, and an L-shaped portion 35 (refer to FIGS. 2 and 3) of the rear cross member 3 form a closed cross-section. Since the portion of the rear cross member 3 near the front end portion of the spare tire housing concave portion 11 of the rear floor is formed to have the L-shaped cross-section, the weight of the rear cross member 3 can be reduced, a large cross-sectional shape can be used, and the rigidity can be improved.

Structure of Rear Cross Member Extension 5

The rear cross member extensions 5 are members which are arranged under the rear floor panel in the vehicle body rear portion, and which couple end portions, in the vehicle width direction, of the rear cross member 3 to the right and left rear side members 2, respectively. As shown in FIGS. 3 and 4, each of the rear cross member extensions 5 includes a front wall 5Z on a vehicle front side Fr, a rear wall 5G on a vehicle rear side Rr, and a bottom wall 5T, and each of the rear cross member extensions 5 is formed to have a hat-shaped cross-section with a top opening. A flange 5F in an upper end portion of the front wall 5Z and another flange 5F in an upper end portion of the rear wall 5G are superposed on and welded (spot-welded) to the lower surface 8K of the floor panel 8. Thus, the rear cross member extension 5 and the floor panel 8 form a closed cross-section.

The width of the end portion, on the vehicle center side W1, of the rear cross member extension 5 is set equal to that of the end portion of the rear cross member 3. The width of an end portion, on the vehicle lateral side W2, of the rear cross member extension 5 is set smaller than that of the end portion, on the vehicle center side W1, of the rear cross member extension 5. The front wall 5Z and the rear wall 5G of a rear cross member extension portion 5A on the vehicle center side W1 are formed in such a manner that the distance therebetween becomes shorter toward the vehicle lateral side W2. The front wall 5Z and the rear wall 5G in a rear cross member extension portion 5B on the vehicle lateral side W2 are formed in shapes of straight walls extending substantially parallel with each other in the vehicle width direction. In other words, since the closed cross-section of the rear cross member 3 is formed by utilizing the front wall of the spare tire housing concave portion 11 in this embodiment of the present invention, the rear wall 5G of the rear cross member extension portion 5A is formed to become closer to the rear side of the vehicle toward the vehicle center side W1 in order to face a shape of the front wall of the spare tire housing concave portion 11. Here, the front wall of the spare tire housing concave portion 11 is bent such that the right and left portions of the spare tire housing concave portion 11 are positioned closer to the vehicle rear side than the center portion of the spare tire housing concave portion 11. This improves the rigidity of a coupling portion to the front wall of the spare tire housing concave portion 11.

The rear wall 5G of the rear cross member extension portion 5A on the vehicle center side W1 becomes smaller in height toward the vehicle center side W1, and it is located closer to the vehicle rear side Rr toward the vehicle center side W1. Thereby, the rear wall 5G is smoothly connected to the front wall of the spare tire housing concave portion 11.

As shown in FIGS. 2 and 3, the flange 5F extending toward the vehicle front side Fr is formed in an end portion, on the vehicle lateral side W2, of the front wall 5Z of the rear cross member extension 5. The flange 5F extending toward the vehicle rear side Rr is formed in an end portion, on the vehicle lateral side W2, of the rear wall 5G of the rear cross member extension 5. Both the flanges 5F are welded to the inner sidewall 7 of the rear side member 2 from the vehicle center side W1. As a result, the closed cross-section formed by the rear cross member 3 and the floor panel 8 can be made continuous to the rear side member 2. Note that, for the convenience of the description, the floor panel 8 is omitted in FIGS. 2 and 3, and FIG. 5 to be described later.

As shown in FIG. 4, the end portion, on the vehicle lateral side W2, of the rear cross member extension 5 passes under the rear side member 2 and extends to the vehicle lateral side W2 of the rear side member 2. Such extending portion 12 is welded to a lower surface 2T1 of the rear side member 2 and to a side surface 6S on the vehicle lateral side W2. In other words, the extending portion 12 extending toward the vehicle lateral side W2 is provided in an end portion, on the vehicle lateral side W2, of the bottom wall 5T of the rear cross member extension 5. The extending portion 12 is welded to the lower surface 2T1 of the bottom wall 2T of the rear side member 2, and to the side surface 6S (outer side surface) of the outer sidewall 6 facing the vehicle lateral side W2. An extending end portion 12A of the extending portion 12 welded to the side surface 6S of the outer sidewall 6 curves upward. This results in firm bonding between the rear side member 2 and the rear cross member extension 5, preventing deformation of the bonded portion by a force input from the coil spring 1.

The bottom wall 5T (including the extending portion 12) of the rear cross member extension 5 has a sufficient area to allow attachment of the coil spring bracket 10 to the bottom wall 5T. Specifically, the bottom wall 5T is formed to have a length in the vehicle front-rear direction greater than the diameter of the coil spring bracket 10. This makes it possible to distribute a force input from the coil spring 1 to the rear side member 2 and the rear cross member extension 5 through the coil spring bracket 10 and the bottom wall 5T (including the extending portion 12) of the rear cross member extension 5.

Structure of Coil Spring Bracket 10

As shown in FIG. 4, the coil spring bracket 10 which receives the upper end portion of the coil spring 1 and keeps the position of the upper end portion is welded to a lower surface of the bottom wall 5T of the rear cross member extension 5. The coil spring bracket 10 is equipped with a spring seat 14 formed of a rubbery elastomer and having a ring shape.

The coil spring bracket 10 includes a spring seat receiver 28 and a convex portion 13. The spring seat receiver 28 includes a peripheral wall 16 having a tapered cylindrical shape becoming wider in a lower direction and thus has an overturned dish-like shape. The convex portion 13 has an overturned circular truncated cone-shape and protrudes downward from a center portion, in the radial direction, of the spring seat receiver 28.

The spring seat 14 includes a fitting tubular portion 15, and a coil spring receiver 17. The fitting tubular portion 15 is fitted on the convex portion 13. The coil spring receiver 17 extends outwardly from an upper end portion of the fitting tubular portion 15 in the radial direction, and is fitted in the peripheral wall 16 of the coil spring bracket 10. The coil spring receiver 17 is formed into a circular plate-like shape. An outer peripheral surface of the coil spring receiver 17 is formed as a tapered surface becoming wider in the lower direction. The fitting tubular portion 15 is fitted on the convex portion 13. The coil spring receiver 17 is fitted in the peripheral wall 16 of the coil spring bracket 10. In this assembled state, the coil spring receiver 17 of the spring seat 14 receives and supports the upper end portion of the coil spring 1 from the above.

As described above, the peripheral wall 16 of the coil spring bracket 10 is formed to become wider in the lower direction, and the outer peripheral surface of the coil spring receiver 17 of the spring seat 14 is formed into the tapered surface becoming wider in the lower direction. Accordingly, it is easy to fit the coil spring receiver 17 to the peripheral wall 16 of the coil spring bracket 10, and hence it is easy to perform a fitting operation. Moreover, it is possible to make the spring seat 14 less likely to be detached from the peripheral wall 16 of the coil spring bracket 10 (less likely to be released from the fitted state).

The diameter of the coil spring 1 is set larger than the width of the rear side member 2. The center O of the coil spring bracket 10 in the radial direction thereof is located near the inner sidewall 7 of the rear side member 2 in plan view. In other words, a half of the coil spring bracket 10 on the vehicle center side W1 is located closer to the vehicle center side W1 than the rear side member 2.

The spring seat receiver 28 in a coil spring bracket portion 10B on the vehicle lateral side W2 is superposed on the bottom wall 2T of the rear side member 2 and the bottom wall 5T of the rear cross member extension 5, and welded (spot-welded) together. The spring seat receiver 28 in a coil spring bracket portion 10A on the vehicle center side W1 is superposed on a flange 18F in a lower end portion of a coil spring reinforcement 18 to be described later, and the bottom wall 5T of the rear cross member extension 5, and welded together. This makes it possible to reliably support, by the coil spring bracket 10, a load applied to a lower surface of the rear cross member extension 5 from the coil spring 1.

Moreover, the center O of the coil spring bracket 10 in the radial direction thereof is located near the inner sidewall 7 of the rear side member 2 in the vehicle width direction. Hence, a load applied from the coil spring 1 can be reliably supported by the inner sidewall 7 of the can rear side member 2.

Furthermore, the front and rear end portions of the coil spring bracket 10 are located near the front wall 5Z and the rear wall 5G in the portion 5A of the rear cross member extension 5 on the vehicle center side W1, and also near a front wall 19Z and a rear wall 19G of a side member brace 19 to be described later, respectively. In other words, a load applied from the coil spring 1 can be reliably supported by the inner sidewall 7, which is reinforced as follows, of the rear side member 2. Specifically, the inner sidewall 7 is reinforced by being connected to the front wall 5Z and the rear wall 5G of the rear cross member extension 5, and the front wall 19Z and the rear wall 19G of the side member brace 19.

Structure of Coil Spring Reinforcement 18

The coil spring reinforcement 18 is a plate-shaped member which is disposed in the rear cross member extension 5. As shown in FIGS. 2 to 4, the coil spring reinforcement 18 is laid between a side surface 7N, on the vehicle center side W1, of the inner sidewall 7 of the rear side member 2 and an upper surface 5T1 of the bottom wall 5T of the rear cross member extension 5. Thus, a lower end portion side of the coil spring reinforcement 18 is located closer to the vehicle center side W1. This coil spring reinforcement 18 functions as a bulkhead which divides a space in the rear cross member extension 5 to improve the rigidity of the rear cross member extension 5.

An upper end portion 18J of the coil spring reinforcement 18 is superposed on the side surface 7N, on the vehicle center side W1, of the inner sidewall 7 of the rear side member 2 from the vehicle center side W1. The upper end portion 18J of the coil spring reinforcement 18, the a flange 19F of a top wall 19J of the side member brace 19, described below, and the inner sidewall 7 of the rear side member 2 are integrally welded together.

Moreover, the flange 18F formed in the lower end portion of the coil spring reinforcement 18 and projecting toward the vehicle center side W1, the bottom wall 5T of the rear cross member extension 5, and the spring seat receiver 28 in the coil spring bracket portion 10A on the vehicle center side W1 are integrally welded together.

Moreover, the flange 18F (refer to FIG. 3) formed in an end portion, on the vehicle front side Fr, of the coil spring reinforcement 18 and projecting toward the vehicle center side W1 is welded to an inner surface (a surface on the vehicle rear side Rr) of the front wall 5Z of the rear cross member extension 5. Meanwhile, the flange 18F formed in an end portion, on the vehicle rear side Rr, of the coil spring reinforcement 18 and projecting toward the vehicle center side W1 is welded to an inner surface (a surface on the vehicle front side Fr) of the rear wall 5G of the rear cross member extension 5 (refer to FIG. 2).

A bead 20 having an arc-shaped cross-section convex toward the vehicle center side W1 and extending in the vehicle front-rear direction is formed in an upper portion of the coil spring reinforcement 18. The bead 20 is located lower than the welded portion between the upper end portion 18J of the coil spring reinforcement 18 and the inner sidewall 7 of the rear side member 2. This increases the rigidity of the coil spring reinforcement 18. Moreover, a through hole H through which paint flows and by which the weight is reduced is formed in a center potion of the coil spring reinforcement 18.

As described above, the coil spring reinforcement 18 is located above the coil spring portion 10A protruding from the rear side member 2 toward the vehicle center side W1. Thus, the coil spring reinforcement 18, together with the inner sidewall 7 of the rear side member 2 and the bottom wall 5T of the rear cross member extension 5, forms a closed triangular cross-section with a high rigidity above the coil spring portion 10A. With this structure, a load applied from the coil spring 1 is received, and the load is transmitted to the inner sidewall 7 of the rear side member 2.

Moreover, as shown in FIG. 4, the inner sidewall 7 of the rear side member 2, the bottom wall 5T of the rear cross member extension 5, and the coil spring reinforcement 18 form a closed space above the vehicle center side W1 of the coil spring bracket 10. In other words, a triangular prism-shaped space with a high rigidity is formed by closing front and rear ends of the closed triangular cross-section with the front wall 5Z and the rear wall 5G of the rear cross member extension 5. This improves the rigidity of the rear cross member extension 5, and also further improves the rigidity of the support structure of the coil spring 1. Hence, a load applied from the coil spring 1 can be reliably received by the support structure.

Structure of Side Member Reinforcement 21

As shown in FIG. 4, both sidewalls 22, 23 of a side member reinforcement 21 which is formed to have a rectangular U-shaped cross-section with a top opening, and which extends in the vehicle front-rear direction are welded to an inner surface of a lower end portion of the outer sidewall 6 of the rear side member 2, and an inner surface of a lower end portion of the inner sidewall 7 of the rear side member 2, respectively. Thus, the side member reinforcement 21 reinforces the rear side member 2.

The sidewall 22, on the vehicle lateral side W2, of the side member reinforcement 21 and the extending end portion 12A of the extending portion 12 of the rear cross member extension 5 together sandwich the lower end portion of the outer sidewall 6 of the rear side member 2. The sidewall 22, the outer sidewall 6, and the extending end portion 12A are integrally welded together.

The bottom wall 2T of the rear side member 2 is inclined in such a manner that the bottom wall 2T is located lower toward the vehicle center side W1. A bottom wall 21T of the side member reinforcement 21 is set in a substantially horizontal orientation (an orientation in parallel with the floor panel 8), and is located close to the bottom wall 2T of the rear side member 2 from above.

Structure of Side Member Brace 19

As shown in FIGS. 3, 4, and 5, the outer sidewall 6 and the inner sidewall 7 of the rear side member 2 located on a lateral side of the rear cross member extension 5 are coupled to each other with the side member brace 19 located above the side member reinforcement 21. Thus, the rear side member 2 is reinforced.

The side member brace 19 includes the front wall 19Z on the vehicle front side Fr and the rear wall 19G on the vehicle rear side Rr. The side member brace 19 also includes the top wall 19J which couples upper end portions of the front wall 19Z and the rear wall 19G to each other. The top wall 19J is set in a substantially horizontal orientation (an orientation in parallel with the floor panel 8). Moreover, the flange 19F protruding toward the vehicle front side Fr is formed in both right and left end portions and a lower end portion of the front wall 19Z. The flange 19F protruding toward the vehicle rear side Rr is formed in both right and left end portions and a lower end portion of the rear wall 19G. The flanges 19F protruding upward are formed in both right and left end portions of the top wall 19J, respectively.

The flanges 19F on the vehicle lateral side W2 are superposed on and welded to the inner surface of the outer sidewall 6 of the rear side member 2. The flanges 19F on the vehicle center side W1 are superposed on and welded to an inner surface of the inner sidewall 7 of the rear side member 2. The flanges 19F of the lower end portions of the front wall 19Z and the rear wall 19G are superposed on and welded to an upper surface of the side member reinforcement 21.

More specifically, as shown in FIG. 4, the flange 19F, on the vehicle center side W1, of the top wall 19J and the upper end portion 18J of the coil spring reinforcement 18 together sandwich the upper end portion of the inner sidewall 7 of the rear side member 2. In such a state, the flange 19F, the upper end portion of the inner sidewall 7, and the upper end portion 18J of the coil spring reinforcement 18 are integrally welded together. With this structure, a load from the coil spring 1 to be transmitted to the coil spring reinforcement 18 is transmitted to the outer sidewall 6 of the rear side member 2 by the side member brace 19 having a rigid shape formed of the front wall 19Z, the rear wall 19G, and the top wall 19J, and can be reliably received.

Moreover, the flange 19F of the front wall 19Z of the side member brace 19 and the flange 5F of the front wall 5Z of the rear cross member extension 5 sandwich the inner sidewall 7 of the rear side member 2. In such a state, the flange 19F of the front wall 19Z of the side member brace 19, the inner sidewall 7, and the flange 5F of the front wall 5Z of the rear cross member extension 5 are integrally welded together.

Likewise, the flange 19F of the rear wall 19G of the side member brace 19 and the flange 5F (refer to FIG. 3) of the rear wall 5G of the rear cross member extension 5 sandwich the inner sidewall 7 of the rear side member 2. In such a state, the flange 19F of the rear wall 19G of the side member brace 19, the inner sidewall 7 of the rear side member 2, and the flange 5F of the rear wall 5G of the rear cross member extension 5 are integrally welded together.

Moreover, as described above, the flange 19F of the top wall 19J of the side member brace 19 and the upper end portion 18J of the coil spring reinforcement 18 sandwich the upper end portion of the inner sidewall 7 of the rear side member 2. The flange 19F of the top wall 19J of the side member brace 19, the upper end portion of the inner sidewall 7, and the upper end portion 18J of the coil spring reinforcement 18 are integrally welded together.

As shown in FIG. 5, the front wall 19Z of the side member brace 19 and the front wall 5Z of the rear cross member extension 5 (the front wall 5Z in the rear cross member extension portion 5B on the vehicle lateral side W2) are located at substantially the same position in the vehicle front-rear direction. The rear wall 19G of the side member brace 19 and the rear wall 5G of the rear cross member extension 5 (the rear wall 5G in the rear cross member extension portion 5B on the vehicle lateral side W2) are located at substantially the same position in the vehicle front-rear direction.

Moreover, through holes H through which paint flows and by which the weight is reduced are formed in the front wall 19Z, the rear wall 19G, and the top wall 19J of the side member brace 19.

Between the front wall 19Z and the rear wall 19G of the side member brace 19, the bottom wall 2T of the rear side member 2 and the spring seat receiver 28 of the coil spring bracket 10 sandwich the bottom wall 5T of the rear cross member extension 5. The bottom wall 2T of the rear side member 2, the bottom wall 5T of the rear cross member extension 5, and the spring seat receiver 28 of the coil spring bracket 10 are integrally welded together.

Connection Structure of Rear Floor Side Brace 40

A partition side brace 30 (corresponding to a reinforcing member) reinforcing the wheelhouse inner panel 9 (corresponding to a vehicle body side portion) is disposed above the outer sidewall 6 of the rear side member 2 and at the same position in the vehicle front-rear direction as those of the rear cross member 3 and the rear cross member extension 5 (refer to FIG. 1).

The partition side brace 30 is welded (spot-welded) to the upper end portion 6J of the outer sidewall 6 of the rear side member 2, and attached to a panel surface, on a vehicle interior side, of the wheelhouse inner panel 9 disposed above the rear side member 2. The partition side brace 30 forms a structure having a closed cross-section extending vertically, together with a suspension bracket (to which an absorber of a suspension is attached) which is attached on the outer side of the vehicle with the wheelhouse inner panel 9 interposed therebetween. Thus, the partition side brace 30 constitutes the reinforcing member reinforcing a partition portion which separates a trunk compartment from a vehicle interior.

A flange portion 7F1 of the inner sidewall 7 located between the front wall 5Z and the rear wall 5G of the rear cross member extension 5 is located below the partition side brace 30 on the vehicle center side W1. The flange portion 7F1 is coupled to the lower end portion of the partition side brace 30 with the rear floor side brace 40 interposed therebetween.

The rear floor side brace 40 is formed to have a rectangular plate-like shape in which both upper and lower end portions are bent at upper and lower intermediate portions. In an assembled state in which the flange portion 7F1 of the inner sidewall 7 and the partition side brace 30 are coupled to each other by the rear floor side brace 40, the upper end portion of the rear floor side brace 40 extends vertically, the lower end portion of the rear floor side brace 40 extends horizontally, and an intermediate portion of the rear floor side brace 40 in its longitudinal direction is inclined in such a manner that a lower side thereof is located closer to the vehicle center side W1.

Beads 41 each having an arc-shaped cross-section convex toward the vehicle center side W1 are formed in both end portions and a center portion, in the vehicle front-rear direction, of the rear floor side brace 40, respectively. Each of the beads 41 extends vertically over the entire length in the vertical direction. This improves the strength of the rear floor side brace 40.

A lower end portion of the rear floor side brace 40 is coupled, with coupling bolts B, to the flange portion 7F1 of the inner sidewall 7, and the floor panel 8 which is superposed on an upper surface of the flange portion 7F1. An upper end portion of the rear floor side brace 40 is coupled, with coupling bolts B, to the lower end portion of the partition side brace 30. In other words, the rear floor side brace 40 forms a triangular closed cross-section above the rear side member 2, together with a portion of the floor panel 8 covering an upper portion of the rear side member 2 and with the wheelhouse inner panel 9. Thus, the rear floor side brace 40 supports the rear side member 2, and reliably receives a load from the coil spring 1.

Multiple bolt insertion holes S through which the coupling bolts B are inserted are formed in each of the flange portion 7F1 of the inner sidewall 7, the floor panel 8, and the lower end portion of the partition side brace 30. Nuts for the coupling bolts B are fixed by welding to a back surface (a lower surface) of the flange portion 7F1 of the inner sidewall 7.

In an upper end portion of the rear floor side brace 40, the bolt insertion holes are formed in an upper and lower pair on each side of the bead 41 in the center portion, in the vehicle front-rear direction, of the rear floor side brace 40. Moreover, in the lower end portion of the rear floor side brace 40, one of the bolt insertion holes is formed on each side of the bead 41 in the center portion, in the vehicle front-rear direction, of the rear floor side brace 40.

In the above-described structure, the partition side brace 30 is coupled to the flange portion 7F1 of the inner sidewall 7 of the rear side member 2. The flange portion 7F1 substantially coincides with a center axis of the coil spring bracket 10 which receives a force from the coil spring 1. This enables a force from the coil spring 1 to be transmitted to a side portion of the automobile, and the force from the coil spring 1 can be reliably received and supported. Accordingly, the rigidity of the vehicle body is improved.

DESCRIPTION OF REFERENCE SYMBOLS

1 COIL SPRING
2 REAR SIDE MEMBER
2T BOTTOM WALL OF REAR SIDE MEMBER
2T1 LOWER SURFACE OF REAR SIDE MEMBER
3 REAR CROSS MEMBER
5 REAR CROSS MEMBER EXTENSION
5T BOTTOM WALL OF REAR CROSS MEMBER EXTENSION
5T1 UPPER SURFACE OF BOTTOM WALL OF REAR CROSS MEMBER EXTENSION
5Z FRONT WALL OF REAR CROSS MEMBER EXTENSION
5G REAR WALL OF REAR CROSS MEMBER EXTENSION
6 OUTER SIDEWALL OF REAR SIDE MEMBER
6S SIDE SURFACE OF REAR SIDE MEMBER
7 INNER SIDEWALL OF REAR SIDE MEMBER
7N SIDE SURFACE OF INNER SIDEWALL OF REAR SIDE MEMBER
7F FLANGE
7F1 PORTION OF FLANGE
8 FLOOR PANEL
9 WHEELHOUSE INNER PANEL
10 COIL SPRING BRACKETS
12 EXTENDING PORTION

18 COIL SPRING REINFORCEMENT
18J UPPER END PORTION OF COIL SPRING REINFORCEMENT
19 SIDE MEMBER BRACE
19Z FRONT WALL OF SIDE MEMBER BRACE
19F FLANGE OF SIDE MEMBER BRACE
19G REAR WALL OF SIDE MEMBER BRACE
19J TOP WALL OF SIDE MEMBER BRACE
30 PARTITION SIDE BRACE
40 REAR FLOOR SIDE BRACE
O CENTER OF COIL SPRING BRACKET IN RADIAL DIRECTION
Fr VEHICLE FRONT SIDE
Rr VEHICLE REAR SIDE
W1 VEHICLE CENTER SIDE
W2 VEHICLE LATERAL SIDE

What is claimed is:

1. A rear suspension spring support structure in which an upper end portion of a coil spring for a rear suspension is supported with a rear side member, wherein
a rear cross member is connected to the rear side member with a rear cross member extension interposed therebetween,
an extending portion, on a vehicle lateral side, of the rear cross member extension passes under the rear side member and extends to the vehicle lateral side of the rear side member, the extending portion of the rear cross member extension being welded to a lower surface of the rear side member and to a side surface, on the vehicle lateral side, of the rear side member,
a coil spring bracket for receiving the upper end portion of the coil spring is joined to a lower surface of the rear cross member extension,
the rear side member includes an outer sidewall on the vehicle lateral side, an inner sidewall on a vehicle center side, and a bottom wall,
the rear cross member extension includes a front wall on a vehicle front side, a rear wall on a vehicle rear side, and a bottom wall,
the extending portion is provided to the bottom wall of the rear cross member extension,
the extending portion is welded to a lower surface of the bottom wall of the rear side member and to a side surface of the outer sidewall of the rear side member,
a center of the coil spring bracket in a radial direction thereof is located near the inner sidewall of the rear side member,
a coil spring reinforcement is laid between a side surface, on the vehicle center side, of the inner sidewall and an upper surface of the bottom wall of the rear cross member extension,
an upper end portion of the coil spring reinforcement is welded to the side surface, on the vehicle center side, of the inner sidewall,
a lower end portion of the coil spring reinforcement, the bottom wall of the rear cross member extension, and the coil spring bracket are integrally welded together, with the bottom wall of the rear cross member extension being sandwiched between the lower end portion of the coil spring reinforcement and the coil spring bracket,
a lower end portion side of the coil spring reinforcement is located closer to the vehicle center side than an upper end portion side,
the coil spring reinforcement, together with the inner sidewall of the rear side member and the bottom wall of the rear cross member extension, forms a closed triangular cross-section above the upper end portion of the coil spring,
and a triangular prism-shaped space is formed by closing front and rear ends of the closed triangular cross-section with the front wall and the rear wall of the rear cross member extension.

2. The rear suspension spring support structure according to claim 1, wherein
the outer sidewall and the inner sidewall of the rear side member located on a lateral side of the rear cross member extension are coupled to each other by a front wall on the vehicle front side and a rear wall on the vehicle rear side which are provided to a side member brace,
the front wall of the side member brace and the front wall of the rear cross member extension are located at substantially the same position in a vehicle front-rear direction, and
the rear wall of the side member brace and the rear wall of the rear cross member extension are located at substantially the same position in the vehicle front-rear direction.

3. The rear suspension spring support structure according to claim 2, wherein
the side member brace includes a top wall coupling an upper end portion of the front wall of the side member brace to an upper end portion of the rear wall of the side member brace,
the top wall of the side member brace couples the outer sidewall of the rear side member to the inner sidewall of the rear side member,
a flange is formed in an end portion, on the vehicle center side, of the top wall of the side member brace, and
the flange of the top wall of the side member brace, an upper end portion of the inner sidewall of the rear side member, and the upper end portion of the coil spring reinforcement are integrally welded together, with the upper end portion of the inner sidewall of the rear side member being sandwiched between the flange of the top wall of the side member brace and the upper end portion of the coil spring reinforcement.

4. The rear suspension spring support structure according to claim 2, wherein
the bottom wall of the rear side member, the bottom wall of the rear cross member extension, and the coil spring bracket are integrally welded together between the front wall and the rear wall of the side member brace.

5. The rear suspension spring support structure according to claim 1, wherein
a flange which is joined to a floor panel is formed in an upper end portion of the inner sidewall of the rear side member,
a reinforcing member which reinforces a side portion of a vehicle is arranged above the outer sidewall of the rear side member, and
a portion of the flange of the inner sidewall located between the front wall and the rear wall of the rear cross member extension is coupled to the reinforcing member with a rear floor side brace being interposed therebetween.

* * * * *

UNITED STATES PATENT AND TRADEMARK OFFICE
CERTIFICATE OF CORRECTION

PATENT NO. : 8,276,926 B2  Page 1 of 1
APPLICATION NO. : 12/818323
DATED : October 2, 2012
INVENTOR(S) : Koyama It is certified that error appears in the above-identified patent and that said Letters Patent is hereby corrected as shown below:

Column 12,
Line 66, "BRACKETS" should read --BRACKET--.

Signed and Sealed this
Ninth Day of April, 2013

Teresa Stanek Rea
*Acting Director of the United States Patent and Trademark Office*